Sept. 1, 1936.  F. W. KUCKLINSKY  2,052,883
METHOD OF TAPING CARTONS AND MACHINES THEREFOR
Filed June 5, 1931   5 Sheets-Sheet 3
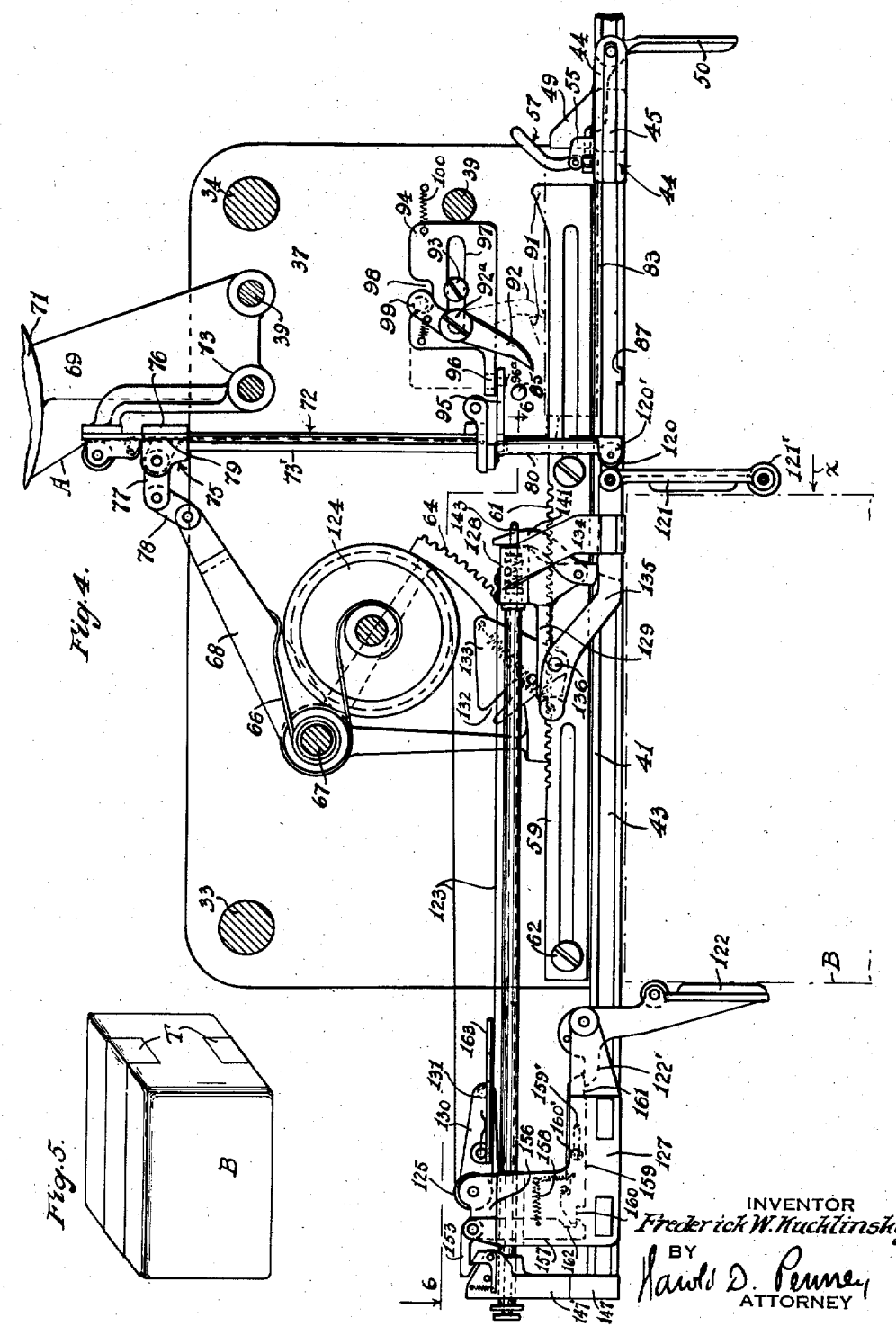

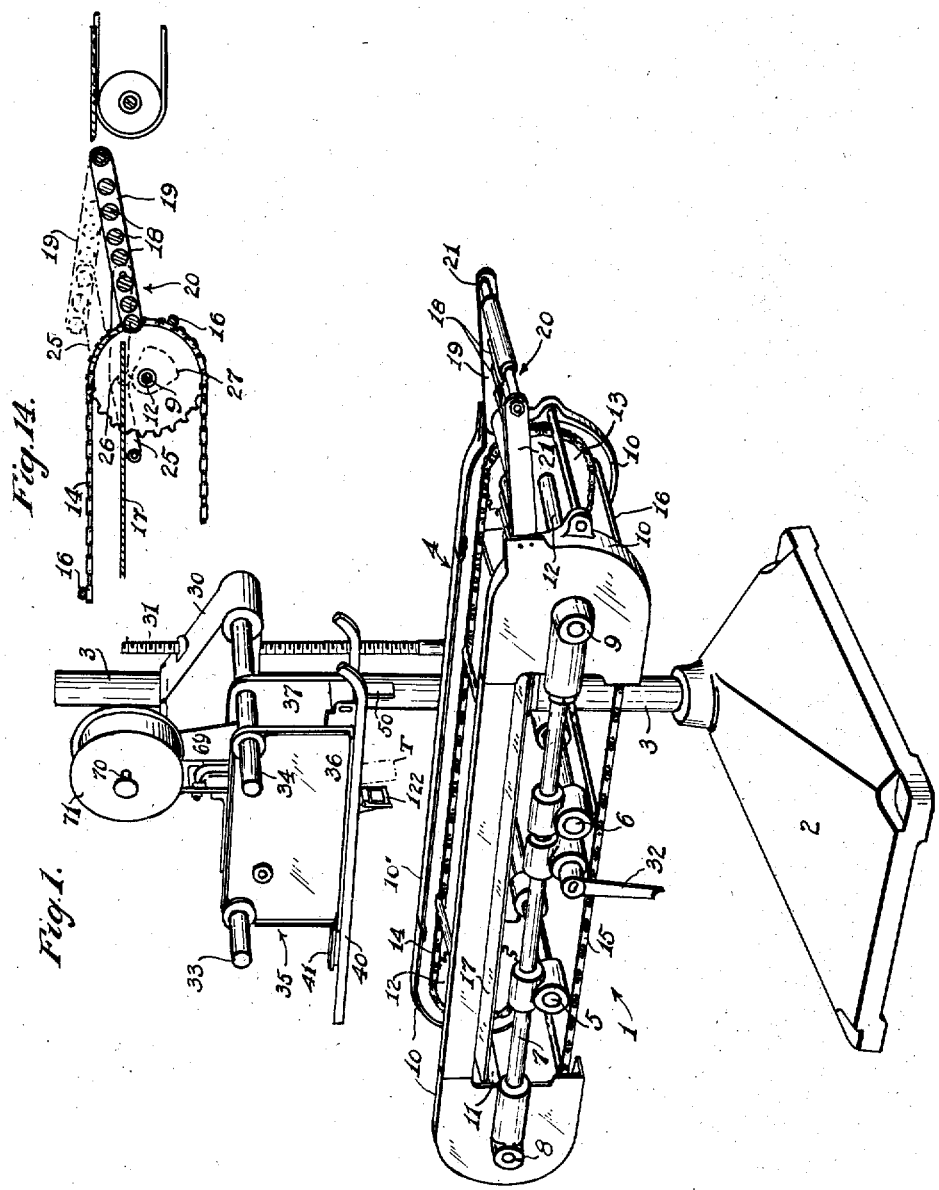

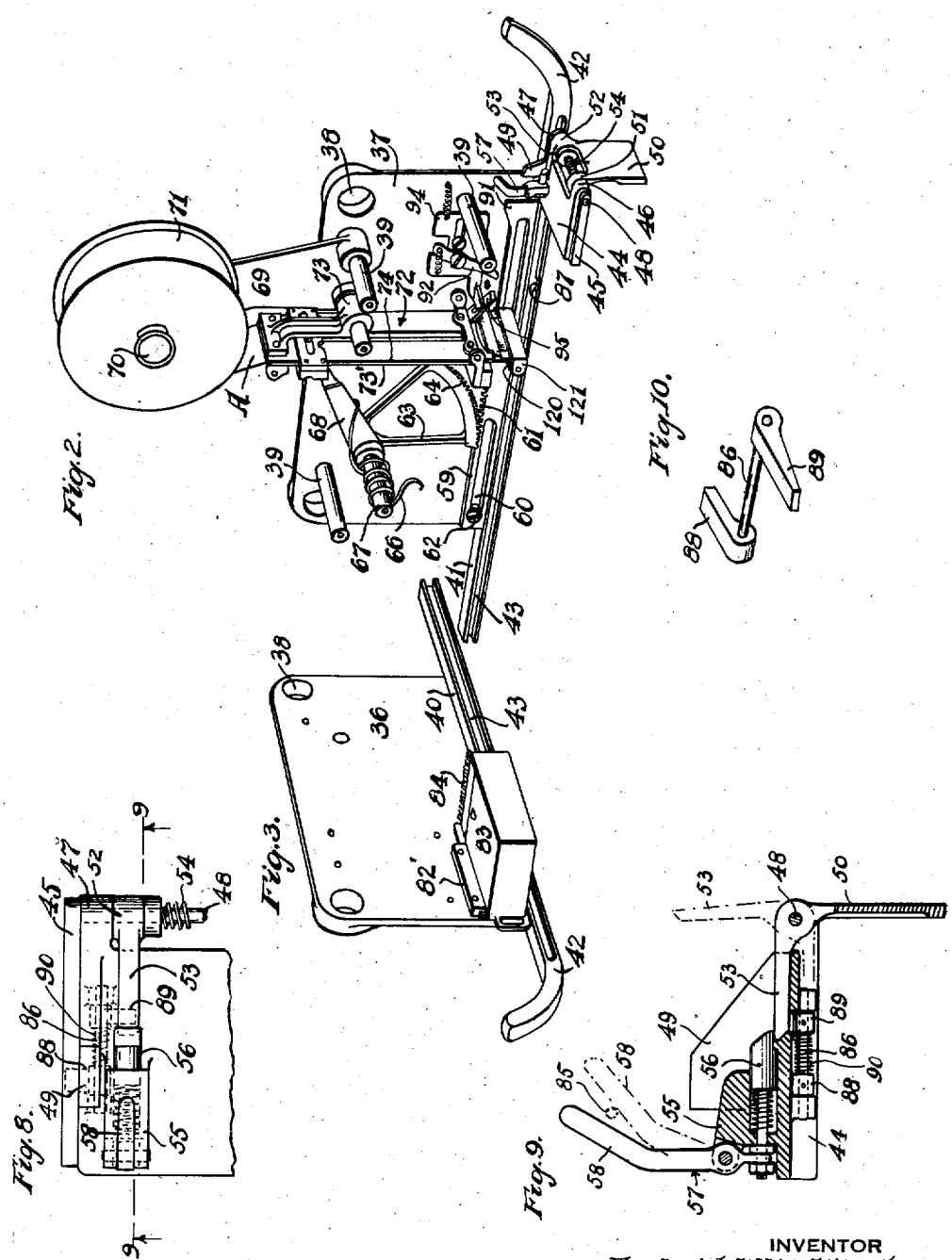

Sept. 1, 1936.   F. W. KUCKLINSKY   2,052,883
METHOD OF TAPING CARTONS AND MACHINES THEREFOR
Filed June 5, 1931   5 Sheets-Sheet 4
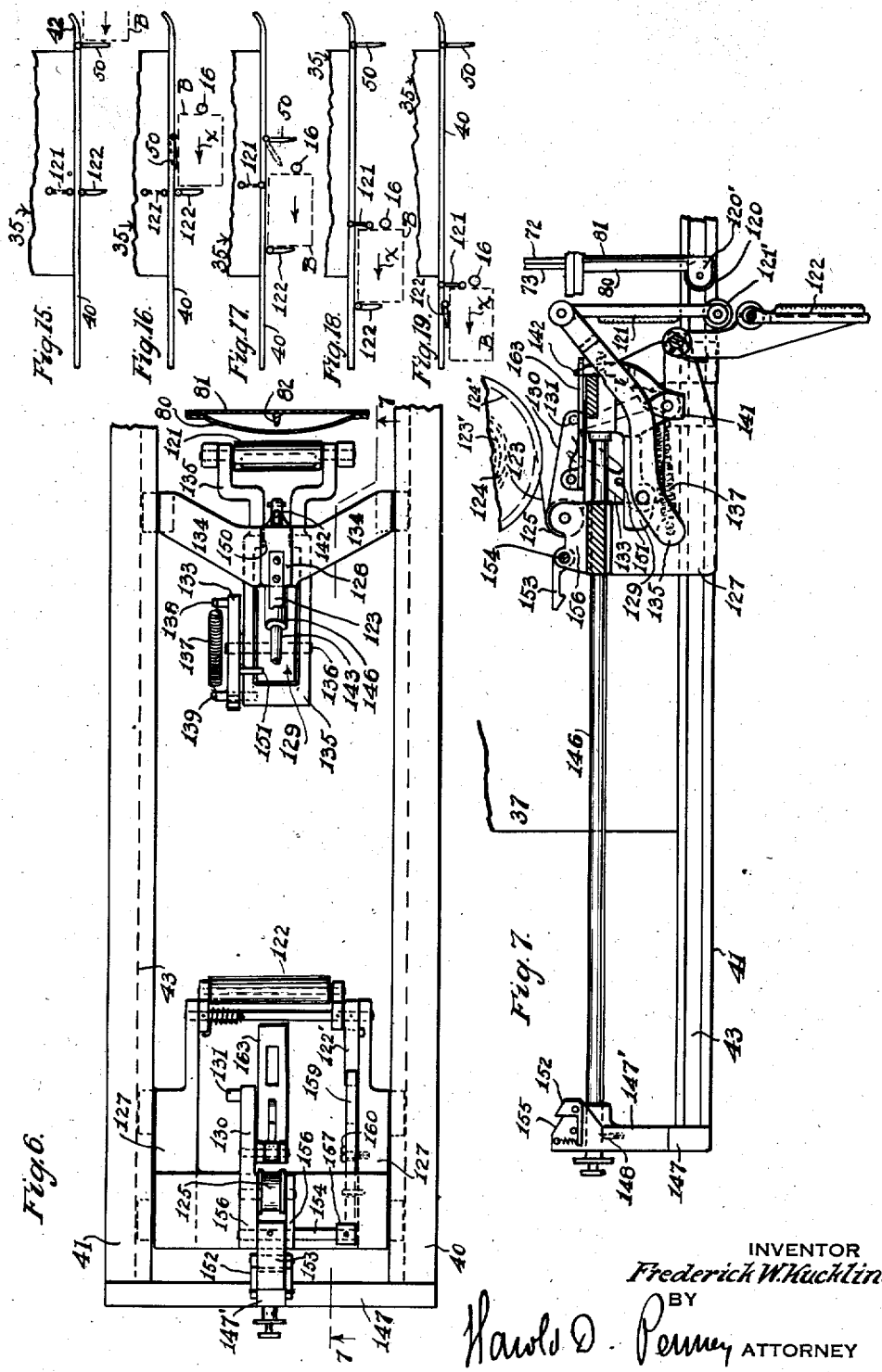
INVENTOR
Frederick W. Kucklinsky
BY
Harold D. Penney ATTORNEY Sept. 1, 1936.   F. W. KUCKLINSKY   2,052,883
METHOD OF TAPING CARTONS AND MACHINES THEREFOR
Filed June 5, 1931   5 Sheets-Sheet 5
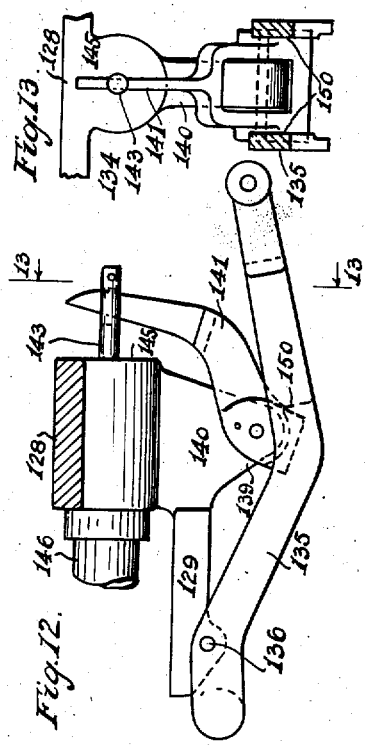
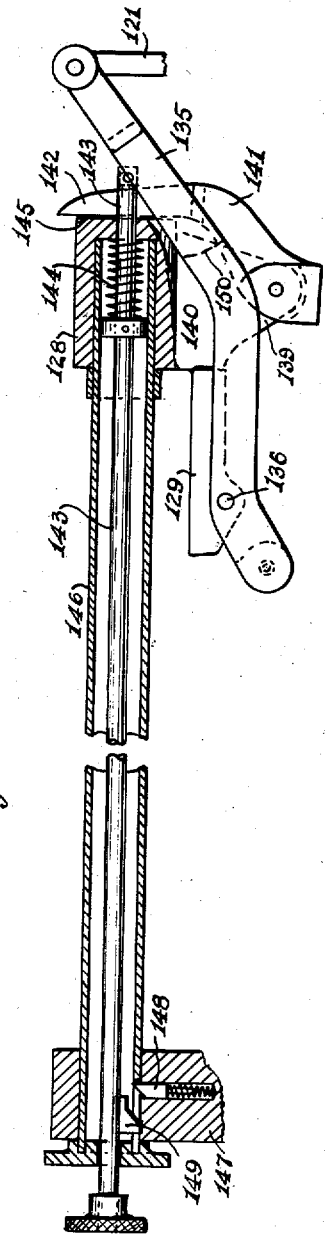
INVENTOR
Frederick W. Kucklinsky
BY
Harold D. Penner   ATTORNEY Patented Sept. 1, 1936

2,052,883

UNITED STATES PATENT OFFICE 2,052,883

METHOD OF TAPING CARTONS AND MACHINE THEREFOR

Frederick W. Kucklinsky, Montclair, N. J., assignor, by direct and mesne assignments, to B & K Machinery Corporation, a corporation of New York Application June 5, 1931, Serial No. 542,330

15 Claims. (Cl. 216—23)

This invention relates to methods and machines for applying adhesive sheet material to articles and more particularly to means and methods for applying continuous gummed tape to cardboard cartons and the like, for sealing the cartons.

One object of the invention is to provide an apparatus and method of this kind for automatically conveying the box to position and automatically applying the tape.

Another object of the invention is to provide an apparatus or method of this kind for automatically regulating the method in accordance with, and to suit, the size of the container to be taped.

Another object of the invention is to provide an apparatus or method of this kind in which the moving carton furnishes the force necessary to effect the operation of the method.

Other objects of the invention are to improve generally the simplicity and efficiency of such methods and apparatus and to provide apparatus of this kind which is economical, durable and reliable in operation, and economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with a tape applying machine which, briefly stated, includes a conveyor for conveying the article or container, and means for feeding a strip of adhesive tape to the article with its adhesive face toward the article, as the article moves on the conveyor. Also there is provided means for moistening the tape, means for causing the tape and article to be pressed together as the article is being conveyed, and means for cutting off the tape. Power is provided for driving the container, and the force of the moving container serves to operate said various means.

In the drawings,

Fig. 1 is a perspective view, showing the machine in operative position for taping.

Fig. 2 is a perspective view of one of the side walls of the tape feed housing, showing the method of assembly of the tape feed mechanism.

Fig. 3 is also a perspective view, showing the opposite side wall of the housing and the method of attaching the moistening box.

Fig. 4 is a side elevation of the tape feed mechanism with one of the side plates of the housing removed.

Fig. 5 is a perspective view of a taped box.

Fig. 6 is a plan, of the upper and lower pad mechanisms, taken on the line 6—6 of Fig. 4.

Fig. 7 is a side view, taken on the line 7—7 of Fig. 6 showing the pad mechanisms nesting together in their rearward position.

Fig. 8 is a plan view of the push plate locking means.

Fig. 9 is a sectional view taken on the line 9—9 of Fig. 8.

Fig. 10 is a perspective view of the push plate locking key and lever.

Fig. 11 is an enlarged sectional view of the upper pad guide tube.

Fig. 12 is an enlarged side elevation of part of the upper pad mechanism.

Fig. 13 is a side view of part of the upper pad mechanism taken on the line 13—13 of Fig. 12.

Fig. 14 is a fragmentary view of box feed control mechanism.

Figs. 15, 16, 17, 18, 19 are diagrammatic views showing the box in its progressive positions.

Referring to Fig. 1, I have shown a tape applying machine 1, comprising a pedestal 2, a standard or column 3 carried thereon, a lower column unit or bracket having a vertical bore received on said column, and a box-conveyor frame 4 carried on said bracket. Said frame comprises a pair of cross bars 5 and 6, longitudinal side bars 7 carried by the cross bars, corner bearing members 8 and 9 carried at the ends of the side bars, each end member having an inwardly turned guard flange 10, and bearing bores alined with similar bores on the opposite side, and an upper chain guard 10' of angle iron connecting the upper part of the bearing member. End sprocket shafts 11 and 12 are in said bearing bores. Suitable power means are provided for driving one or more of said shafts to which are attached sprocket wheels 12—13 adapted to convey sprocket chains 14—15 one of which is located on each side of the frame, and disposed under the chain guard 10 and guard flange 10'.

Transverse push bars 16, which serve to push the boxes are connected to opposite links of the respective chains. A horizontal plate 17 forming a slide way or platform extending under the said bars 16 of the upper course is secured to said corner members. This plate forms a slide way on which the boxes B (Fig. 5) are pushed.

Timed means are provided for feeding the boxes at intervals to said plate or slide way 17. Said means comprises a series of rolls 18 (Fig. 14, Sheet 1) rotatably supported in side bars 19, forming a rocking table as 20 which is pivotally held in place by a pair of upwardly and slanted parallel bracket bars 21 carried by the receiving-end corner members 10. The rocking table side bars 19 are pivotally connected at their rear ends to the upwardly slanted bracket bars 21, and at their forward section with link arms 25 pivoted to the corner members 10. Rollers 26, carried on the link arms 25, are adapted to engage cams 27 secured to the sprocket shaft 12.

The cams 27 are shaped to maintain the rocking table 20 horizontally for receiving a box, and at the proper time they rock the table downward to cause the box to move by gravity onto the plate 17, to be later caught by a push bar 16.

The column 3 carries an upper column unit or bracket 30 having a vertical bore and key adapted to be received on the column 3 and in a key way thereon. Adjustable means are provided for raising and lowering the bracket 30 comprising a threaded rod 31 having threaded engagement with the upper bracket 30 and rotary engagement with the lower bracket. A crank shaft and handle 32 suitably mounted on the side bars 7, of the box conveying mechanism is in operative connection with the rod 31, and serves to raise or lower the said bracket 30.

Supporting bars 33, 34 projecting horizontally from the upper bracket 30, slidably support a taping mechanism housing 35 comprising a pair of side plates 36—37 having bores 38 (Figs. 3 and 4) in their upper corners to engage said supporting bars 33, 34; and the said plates 36 and 37 are held in operating position by tie bolts 39. A pair of longitudinally disposed guide bars 40, 41 carried on the lower edges of said side plates 36, 37 respectively have upwardly curved receiving ends 42; and each has a longitudinal track groove 43 on its inner face.

A slide block 44 has edge ribs 45, adapted to slidably engage in said grooves 43, 43, and a pair of rearwardly disposed bored ears 46, 47, adapted to receive a pivot pin 48. The slide block also carries a push lug 49 at one end edge.

A normally vertical pivoted push plate 50 adapted to be engaged by the sliding box and provided with bored ears 51, 52 is disposed on said pin 48, one of the ears, the ear 52, having a forwardly disposed retaining finger 53.

A coiled spring 54 around the pin 48 engaging the slide block 44 and the push plate 50 tends to hold the said plate in normal vertical position, with the finger 53 against the block 44.

A lug 55 (Fig. 9) integral with the said slide block 44 and near the said push lug 49, has therein a bore parallel to the guide grooves 43, adapted to receive a slidable bolt 56. The bolt 56 normally engages over the said finger 53, whereby when a box is pushed forward against the plate 50, the finger is held against rising and the block 44 is moved forward. A retracting lever 57 intermediately pivoted on the forward end of the bolt receiving lug 55, has its lower end engaging the bolt 56, while the upper end has an upturned motive arm 58 adapted, when moved rearwardly relative to the block 44, to retract the said bolt 56 to release the finger 53.

A rack bar 59 (Fig. 2) having an upturned butt end 91, rack teeth 61 and slots 60, 60 is adapted to slide on the inner face of the side plate 37, guided by screws 62, passing through the said slots and into the side plate. A gear sector 63, pivoted on a shaft 67 against the side plate 37 above the rack bar 59, is provided with gear teeth as 64 engaging with the said rack teeth 61, whereby the sector is caused to rotate as the said rack 59 is pushed forward by the block 44. A spring 66 coiled around the sector shaft 67, tends to restore the sector.

No motor power is applied direct for operating the tape mechanism; the force required to actuate the several movements is furnished by the traveling box B (Fig. 15), pushing forward the vertical plate 50 and slide block 44 a predetermined distance. The tape sealing is done by a forward pad and coacting members later to be described; while the tape feed and cut off mechanisms are actuated by the forward movement of the rear vertical slide plate 50. When a box is pushed under the guide bars 40 and 41, it will push the slide plate 50 and the block 44 which abuts the rack bar 59 causing it to slide and actuate the sector 63 and a tape feed actuating arm 68 which moves with the said sector.

A tape spool bracket 69 (Fig. 2) is mounted on certain of the said rods 39 and provided with a laterally projecting pin 70 adapted for carrying a spool of tape 71. A vertical rectangular shaped tube 72 is supported by a bracket 73 mounted on one of said tie rods below the spool and to the rear of the sector feed arm 68. The said tube 72 comprising front and rear spaced plates 73' and 74 respectively between which the rearwardly gummed tape A is received, each plate having a vertical axial slot therein.

A clutch mechanism 75 (Fig. 4) for feeding the tape comprises a clutch collar 76 vertically slidably received on said tube and provided on the side toward the feed arm 68 with a pair of spaced ears between which a clutch lever 77 is pivoted. Said lever is linked by a link 78 to the said feed arm 68 and is provided with a clutch end face 79 disposed in the adjacent slot and engageable with the tape A.

When the said rack 59 is pushed forward, the sector arm 68 moves downwardly and draws down the motive end of the clutch lever 77, causing the clutch face 79 to grip the tape A against the collar 76, and causing the clutch to ride downwardly and feed down a length of tape in front of the oncoming box. The lower end of the tape guide tube is formed transversely concaved on its forward face 80 (Fig. 6), and the rear face 81 is provided with a projection 82, which causes the tape to move against the said face 80 thereby to be forwardly transversely curved, and longitudinally stiffened.

A block 82' (Fig. 3) which is attached to the inner face of the side plate 36 is provided with a groove in its lower face, adapted to engage and slidably hold the top side edge flange of a moisture box 83. The forward upper edge of the moisture box 83, is provided with a slot opening through which projects a wick or brush 84 which engages the gummed face of the tape A at the above mentioned curved part and moistens the same as the tape is fed.

When taping a box, it is necessary initially to feed a strip of tape, through the tube guide, of a length sufficient to properly start the sealing on the advance face of the box a short distance below the top face of the box. Therefore I have provided a stop 85 (Fig. 4) for stopping the sliding movement of the plate 50 and slide block 44, thereby to stop the tape feeding mechanism, at a time when the proper length of tape has been fed.

Said stop 85 is secured on the side plate 37 and engages the retracting lever 57 of the slide block 44 as the said block moves forward, pushed by the box, thereby to release the bolt 56 and permit the box to push up the pivoted plate 50, while the box continues to move forward under the action of the conveyor, the moving box later drawing out enough tape to suit the size of the box to be taped, as will be explained.

After the slide block 44 has moved as far forward as required to feed the proper length of tape, it is necessary to hold the block 44 in this forward position until the rear edge of the box has passed, therefore I have provided a locking means comprising a short shaft 86 (Figs. 9 and 10) mounted on the slide block 44 transverse thereto and longitudinal to its path and having an integral detent finger 88 adapted to engage in a notch 87 in the side of the groove 43 of one of the guide bars 41.

A spring 90 engages the said shaft and tends to move the finger 88 into the notch 87; and a lever arm 89, also on the shaft 86, is adapted to be engaged by the retaining finger 53 of the block 44. When the block 44 (referring to Figs. 2, 8-9 and 10) reaches its forward position, the stop pin 85 causes the arm 57 to release the bolt 56 and the arm 53. This releases the lever 89 and the spring 90 and causes the detent 88 to engage the said notch 87. As explained the release of the finger 53 permits the sliding box to move beyond the slide block 44; and the plate 50 which folded to allow the box to pass, assumes its vertical position and the arm 53 again depresses the lever 89 which releases the detent 88 from the notch 87 allowing the block 44 to slide back to its normal position as shown in Figs. 15, 18 and 19 being pushed back by the rack bar 59 influenced by the sector 63 and spring 66.

A spring held pivoted lever 92 (Fig. 4) intermediately pivoted on the shouldered screw 92a is provided to actuate the knife 95 (Fig. 2) to cut the tape as the said slide block 44 returns. This lever actuates a slotted plate 94 having a recessed portion 98 at its top edge and an outwardly turned lug 96 at its bottom edge, is provided with a horizontal slot 97 received on the screws 92a and 93 whereby the plate is slidably secured to the wall plate 37, and is held out of actuating position by a spring 100.

The said pivoted lever 92 carries fast in its upper end a pin 99 adapted to engage one side edge of the recess 98; and the extended lug 96 carries a pin 96a adapted to engage in a slot in the pivoted arm of the knife 95 as shown in Figs 2 and 4, and as the slide block 44 and rack bar 59 move back to their said normal positions, the lug 91 of the said rack bar 59 engages the lower end of the lever 92 and carries it back to the position of the dot and dash lines of Fig. 4, thereby causing the plate 94 to move forward and carry the knife a distance sufficient to cut the tape.

Below the tape guide tube 72 (Figs. 4, 6 and 7) there is provided a roller 120 rotatably supported by ears 120' formed on the lower end of the guide tube. It has been found advantageous to curve the tape while being moistened by the brush 84, and the said tape roller 120 serves to flatten and guide the tape after moistening.

In Fig. 7 is shown a mechanism including pressure pads 121, 122 adapted to press moistened tape to the box B (Fig. 5) shown in dot and dash lines in Figs. 15 to 19. The said pads 121 and 122 and referred to throughout this description, as the upper and lower pads respectively, are held in their retracted position by a spring 123' (Fig. 7) housed in a spring barrel 124' in a housing 124 which is supported between the side plates 36 and 37. A ribbon 123 has one end anchored in the barrel 124 and passes over a roller 125 which is secured to an upper portion 156 of the lower pad slide bracket 127. Said ribbon has its other end anchored to the upper central portion 128 (Fig. 6) of the upper pad slide bracket 129.

A length T of moistened tape A, fed through the tape tube 72, by the slide block 44, as previously mentioned, is pressed against the lower pad 122, by the moving box B, thereby causing the said tape to adhere to the box, and the said moving box causes the said lower pad 122 to slide along with it thereby increasing the tension of the said spring 123', until a position is reached whereby the rear end of the box, as shown in Fig. 17, is approximately under the tape guide tube 72, which position allows the slide block 44 and plate 50 to return to its normal rearward position. The said slide block 44 in its rearward movement trips the lever 92 of the knife mechanism Fig. 4 which causes the tape to be cut at its cycle of operation. After the tape has been cut, a further forward movement of the box B causes the upper pad 121 and its associated roller 121' which has been rolling down the tape on the upper side of the said box, to drop down on the rear side of the box. The barrel spring 123' which has been tensioned as previously mentioned draws the said upper pad 121 tight to the moving box, Fig. 18, thereby sealing the gummed tape thereto.

It will be noted, referring to Figs. 4 and 6, that the upper central portion 156 of the lower pad bracket 127 has an extension 130 to which is secured a pin 131 adapted to engage a slotted portion 132 of a rocker plate member 133, which is pivotally attached to the upper pad slide bracket 129. The said upper pad bracket 129 Fig. 6, is provided with arms 134 adapted to slide in the grooves 43 of the slide bars 40 and 41. The said bracket is constructed to pivotally support by a stationary shaft 136, a forked member 135, which pivotally supports the upper pad 121 and roller 121'.

The rock plate 133 pivoted on the same shaft 136 as the fork member 135, is provided with a coil spring 137 strained between a pin 138 on one end of the rock plate 133 and a pin 139 on the end of the fork member 138, whereby the rock plate 133 and spring 137 serve to raise or lower the said fork 135 and pad member 121. A forked lock lever 141 (Fig. 7) pivotally supported by a downwardly extended lug 139 on the lower central portion 140 of the upper pad bracket 129, and more clearly illustrated in Figs. 11, 12 and 13 serves to hold the fork member 135 in its downward position. The upper end 142 of the lock lever 141 passes through and above a slotted rod 143, which is tensioned by a spring 144 to keep the lock lever 141 against the face 145 of the central portion of the said pad bracket 129.

The said rod 143 is slidably supported within a slide tube 146, and the said tube is secured to the central portion 128 of the upper pad bracket 129 and slidably supported in a cross bar member 147 of the slide bars 40 and 41. A detent pin 148 located in the said cross member 147, Fig. 11, serves to hold the said tube 146 in a locked position, and also holds the upper pad bracket 129 in its rearward position, until the said lever 141 is caused to move by the inner cam faces 150 of the fork arm 135, thereby rocking the said lever 141 outwardly and sliding the said rod 143 rearwardly, when a suitable key 149 (left of Fig. 11) secured to the said rod 143 moves the said detent 148 down and permits tube 146, and the upper pad and bracket 140 to be moved forward.

When the lower pad 122 (Figs. 4 and 7) and its supporting bracket 127 are moved forward by the box B as shown by the arrow X of Fig. 4, the rock plate actuating pin 131 which is secured to the lower pad bracket 127, slides out of the slot 132, provided in the rock plate 133 and in so doing causes the said plate to rock a distance around its shaft 136 until a stop pin 151 attached to the rock plate 133, rests upon the top surface of the center portion of upper bracket 129.

The rock plate 133 supports one end 138 of a tension spring 137, the other end of said spring being attached to a pin 139 extending from the forward end of the fork member 135 of the upper pad assembly, tends to force the said fork and pad 121 downward, when the said rock plate 133 is in the position aforementioned, and shown in Fig. 4. When the rock plate is in the position as shown in Fig. 7, the spring 137, lies below the center of rotation of the plate 133 and fork member 135, therefore the tendency is for the spring to lift the said fork and pad member.

It will now be understood from the above mentioned movement of the upper and lower pad members 121 and 122 that the position of the box B and said pads will be approximately as shown diagrammatically in Fig. 18, and a further movement of the box in the direction of the arrow X will cause the lower pad 122 to tilt and allow the box to pass under it as shown in Fig. 19. This tilting action of the said pad will now be explained.

The cross bar member 147, Fig. 7, secured to the ends of the slide bars 40 and 41, is provided with a central upwardly extending portion 147' which supports a spring held pawl 152 adapted to engage a pivoted latch member 153 of the slide bracket 127. When the said bracket reaches the end of the slide, the said pivoted latch 153 which is fast on a shaft 154 is caused to ride over and depress the spring held pawl 152 and ride to the inclined surface 155 of the center portion 147' of the cross bar member, when the said pawl 152 then rises to engage and hold the said latch 153.

The pivoted latch member 153 Figs. 6 and 7, is fast on the shaft 154 which is held in bearings 156 on the slide bracket 127, and the said shaft 154 supports a downwardly hanging arm 157 (left of Fig. 4) which is held, by a spring 158, in contact with an intermediate spring-held slotted lever 159, which lever serves to lock the lower pad 122 in a downward position. The slotted holding lever 159 is formed of flat material and is slidably held in place by a shoulder screw 160' to the inner wall of the slide bracket 127, and is so formed with a nose as 160 and 161 at each end adapted to engage a recessed portion 162 of the arm of the latch member 157, and an extended portion of the pad member 122'.

From the above mentioned details of the lower pad locking means, the method of releasing the pad can be readily understood. When the lower pad 122 reaches a point, which is a distance equal to the length of the box being sealed, the upper pad 121 drops down behind the said moving box, and the lower pad 122 folds to allow the box to pass. This folding of the said lower pad, is accomplished by the pivoted latch 153 (Fig. 4) of the lower pad bracket 127, riding up the angular surface 155 of the cross bar member 147, which tilts the said latch member 153, and the shaft 154, and rocks the downwardly hanging arm 157 which causes the slotted holding lever 159 to offer no resistance to the urge of the extended arm portion 122' of the pad 122, which rotates in a clockwise direction. The pad 122 being integral with the said arm portion 122' also moves and permits the box to pass.

As the rear end of the moving box B, (Fig. 19), nears the collapsed or folded lower pad 122, the upper pad and bracket 129 nest with the bracket 127 of the lower pad, thereby rocking the plate 133 to the position shown in Fig. 7. An extended hinged arm 163 of the lower pad bracket 127, pushes the upwardly extended portion 138' of lever 138 thereby releasing the forked pad carrying member 135, which has been held down by the said lever 138, and allowing the rocking plate spring 137 to cause the forked pad bracket 135 to lift the upper pad 121.

When the lower pad bracket 127 reached its forward position, the latch member 153 became latched as previously mentioned to the spring held pawl 152 of the cross bar 147, and remained locked until the rear end of the box passed the folded lower pad 122, when the said pad drops to its vertical position and so doing the extended arm 122', of the said lower pad 122 tapped the nose portion 161 of the slotted lever 159, causing it to ride forward in its slot 159' and push the downward hanging arm 157 thereby rocking the shaft 154 and lifting the latch member 153, which releases the upper and lower pad mechanism and permits the barreled spring 123 to return the said pads to their normal positions.

I claim as my invention:

1. In a machine for applying adhesive tape to articles, tape feeding means, means for conveying an article to said tape feeding means, means engaged by the moving article for operating said tape feeding means to feed tape in front of and in advance of the moving article, and means for pressing the tape to the article while the article is being conveyed.

2. In a machine for applying adhesive tape to articles, a tape supply, tape feeding means, means for conveying an article to and past said tape feeding means, a first movable means disposed in the path of and engaged by the moving article and travelling therewith a pre-determined distance for operating said tape feeding means to project tape from said supply a pre-determined distance across the path and in advance of the article being conveyed, a second movable means disposed in the path of and engaged by the moving article and travelling therewith a pre-determined distance for pressing the projected portion of tape to the front face of the article during the travel therewith of said means and for pressing tape drawn from said supply by the moving article to the intermediate face of the article after said means has reached the end of the pre-determined distance of travel with the moving article, tape severing means operated by said feeding means for stopping the withdrawal of tape from said supply by the article, and a third movable means for engaging the rear face of the moving article and pressing the tape end thereto.

3. In a machine for applying adhesive tape to articles, a tape supply, tape feeding means, means for conveying an article to and past said tape feeding means, a first movable means disposed in the path of and engaged by the moving article and travelling therewith a pre-determined distance for operating said tape feeding means in one direction to project tape from said supply a pre-determined distance across the path and in advance of the article being conveyed, a second movable means disposed in the path of and engaged by the moving article and travelling therewith a pre-determined distance for pressing the projected portion of tape to the front face of the article during the travel therewith of said means and for pressing tape drawn from said supply by the moving article to the intermediate face of the article after said means has reached the end of the pre-determined distance of travel with the moving article, means operated by said first movable means during the travel thereof with the article to store energy and said energy being utilized to return said tape feeding means and said movable means to normal position, tape severing means operated by the return of said feeding means to normal position for stopping the withdrawal of tape from said supply by the article, and a third movable means for engaging the rear face of the moving article and pressing the tape end thereto.

4. In a machine of the character described, tape feeding means, means for conveying an article to said tape feeding means, movable means disposed in the path of and engaged by the moving article and travelling therewith a pre-determined distance for operating said tape feeding means, said movable means comprising a slide member mounted in guideways, a plate pivoted on said slide member, locking means on said slide member maintaining said plate in normal position across the path of the article, releasing means for said locking means, said plate yielding to movement of the article and swinging out of the path thereof upon engagement between said locking and releasing means approximate the end of the pre-determined distance of travel of said slide member with the article.

5. In a machine of the character described, tape feeding means, means for conveying an article to said tape feeding means, movable means disposed in the path of and engaged by the moving article and travelling therewith a pre-determined distance for operating said tape feeding means in one direction, and means operated by said movable means during the travel thereof with the article to store energy said stored energy being utilized to return said tape feeding means and said movable means to normal position.

6. In a machine of the character described, tape feeding means, means for conveying an article to said tape feeding means, movable means disposed in the path of and engaged by the moving article and travelling therewith a pre-determined distance for operating said tape feeding means in one direction, and spring means operated by said movable means during the travel thereof with the article to store energy said stored energy being utilized to return said tape feeding means and said movable means to normal position.

7. In a machine of the character described, tape feeding means, means for conveying an article to said tape feeding means, movable means disposed in the path of and engaged by the moving article and travelling therewith a pre-determined distance for operating said tape feeding means in one direction, means operated by said movable means during the travel thereof with the article to store energy said stored energy being utilized to return said tape feeding means and said movable means to normal position, tape severing means associated with said tape feeding means, and a member on said tape feeding means engaging and causing the operation of said tape severing means as said tape feeding means and said movable means are returned to normal position by the stored energy in said means as aforesaid.

8. In a machine of the character described, tape feeding means, means for conveying an article to said tape feeding means, movable means disposed in the path of and engaged by the moving article and travelling therewith a pre-determined distance for operating said tape feeding means in one direction, spring means operated by said movable means during the travel thereof with the article to store energy said stored energy being utilized to return said tape feeding means and said movable means to normal position, tape severing means associated with said tape feeding means, and a member on said tape feeding means engaging and causing the operation of said tape severing means as said tape feeding means and said movable means are returned to normal position by the stored energy in said spring means as aforesaid.

9. In a machine for applying adhesive tape to articles, tape feeding means projecting tape across the path and in advance of an article being conveyed, means for conveying the article to and past said tape feeding means, movable means disposed in the path of the moving article and travelling therewith a pre-determined disance for pressing the projected portion of tape to the front face of the article, and means operated by said movable means during the travel thereof with the article to store energy, said energy being utilized to return said movable means to normal position.

10. In a machine for applying adhesive tape to articles, tape feeding means projecting tape across the path and in advance of an article being conveyed, means for conveying the article past said tape feeding means, movable means disposed in the path of the moving article and travelling therewith a pre-determined distance for pressing the projected portion of tape to the front face of the article during the travel therewith of said movable means, said movable means comprising a slide member mounted in guideways, a pressure member pivoted on said slide member, locking means on said slide member maintaining said pressure member in normal position across the path of the article, releasing means for said locking means, said pressure member yielding to movement of the article and swinging out of the path thereof upon engagement between said locking and releasing means approximate the end of the predetermined distance of travel with the article.

11. In a machine of the character described, a pressure unit for forcing adherence between a length of adhesive tape and an article, said pressure unit comprising a rotatable member and a sliding pad member, said rotatable member mounted in juxtaposition squeegeeing said tape as it rotates thereover, and said sliding pad member pressing and smoothing said tape into uniform contact with the article after the tape has been squeegeed by said rotatable member.

12. In a machine of the character described, a pressure unit for forcing adherence between a length of adhesive tape and an article, said pressure unit comprising a resilient rotatable member and a resilient sliding pad member, said resilient rotatable member mounted in juxtaposition squeegeeing said tape as it rotates thereover and said resilient sliding pad member pressing and smoothing said tape into uniform contact with the article after the tape has been squeegeed by said rotatable member.

13. In a machine for applying adhesive tape to articles, tape feeding means, means for conveying an article to said tape feeding means, means actuated by the moving article for operating said tape feeding means to feed tape in front of and in advance of the moving article, and means for pressing the tape to the article while the article is being conveyed.

14. In a machine for applying adhesive tape to articles, tape feeding means, means for conveying an article to said tape feeding means, means controlled by the moving article for operating said tape feeding means to feed tape in front of and in advance of the moving article, and means for pressing the tape to the article while the article is being conveyed.

15. The method of applying adhesive tape to pre-determined faces of articles, which method consists in advancing the free end of a gummed tape to a pre-determined position in the path of one of said articles, wetting the gummed portion of said tape as it is moved, advancing an article into contact with the moistened tape, further advancing the article, further advancing additional tape and moistening the same, pressing the tape to said article, cutting the tape at a pre-determined place, and pressing the trailing end of said tape to the next adjacent face of said article.

FREDERICK W. KUCKLINSKY.

CERTIFICATE OF CORRECTION.

Patent No. 2,052,883.                                                September 1, 1936.

FREDERICK W. KUCKLINSKY.

It is hereby certified that error appears in the printed specification of the above numbered patent requiring correction as follows: Page 5, second column, line 66, and page 6, first column, line 1-2, claims 11 and 12 respectively, strike out the words "mounted in juxtaposition" and insert the same after "member" and before the comma, page 5, second column, lines 65 and 75 respectively, same claims; and that the said Letters Patent should be read with these corrections therein that the same may conform to the record of the case in the Patent Office.

Signed and sealed this 13th day of October, A. D. 1936.

Henry Van Arsdale (Seal)                                              Acting Commissioner of Patents.

resilient rotatable member mounted in juxtaposition squeegeeing said tape as it rotates thereover and said resilient sliding pad member pressing and smoothing said tape into uniform contact with the article after the tape has been squeegeed by said rotatable member.

13. In a machine for applying adhesive tape to articles, tape feeding means, means for conveying an article to said tape feeding means, means actuated by the moving article for operating said tape feeding means to feed tape in front of and in advance of the moving article, and means for pressing the tape to the article while the article is being conveyed.

14. In a machine for applying adhesive tape to articles, tape feeding means, means for conveying an article to said tape feeding means, means controlled by the moving article for operating said tape feeding means to feed tape in front of and in advance of the moving article, and means for pressing the tape to the article while the article is being conveyed.

15. The method of applying adhesive tape to pre-determined faces of articles, which method consists in advancing the free end of a gummed tape to a pre-determined position in the path of one of said articles, wetting the gummed portion of said tape as it is moved, advancing an article into contact with the moistened tape, further advancing the article, further advancing additional tape and moistening the same, pressing the tape to said article, cutting the tape at a pre-determined place, and pressing the trailing end of said tape to the next adjacent face of said article.

FREDERICK W. KUCKLINSKY.

CERTIFICATE OF CORRECTION.

Patent No. 2,052,883.  September 1, 1936.

FREDERICK W. KUCKLINSKY.

It is hereby certified that error appears in the printed specification of the above numbered patent requiring correction as follows: Page 5, second column, line 66, and page 6, first column, line 1-2, claims 11 and 12 respectively, strike out the words "mounted in juxtaposition" and insert the same after "member" and before the comma, page 5, second column, lines 65 and 75 respectively, same claims; and that the said Letters Patent should be read with these corrections therein that the same may conform to the record of the case in the Patent Office.

Signed and sealed this 13th day of October, A. D. 1936.

Henry Van Arsdale (Seal)  Acting Commissioner of Patents.

CERTIFICATE OF CORRECTION.

Patent No. 2,052,883. September 1, 1936.

FREDERICK W. KUCKLINSKY.

It is hereby certified that error appears in the printed specification of the above numbered patent requiring correction as follows: Page 5, second column, line 66, and page 6, first column, line 1-2, claims 11 and 12 respectively, strike out the words "mounted in juxtaposition" and insert the same after "member" and before the comma, page 5, second column, lines 65 and 75 respectively, same claims; and that the said Letters Patent should be read with these corrections therein that the same may conform to the record of the case in the Patent Office.

Signed and sealed this 13th day of October, A. D. 1936.

Henry Van Arsdale (Seal)

Acting Commissioner of Patents.